United States Patent Office 3,032,434
Patented May 1, 1962

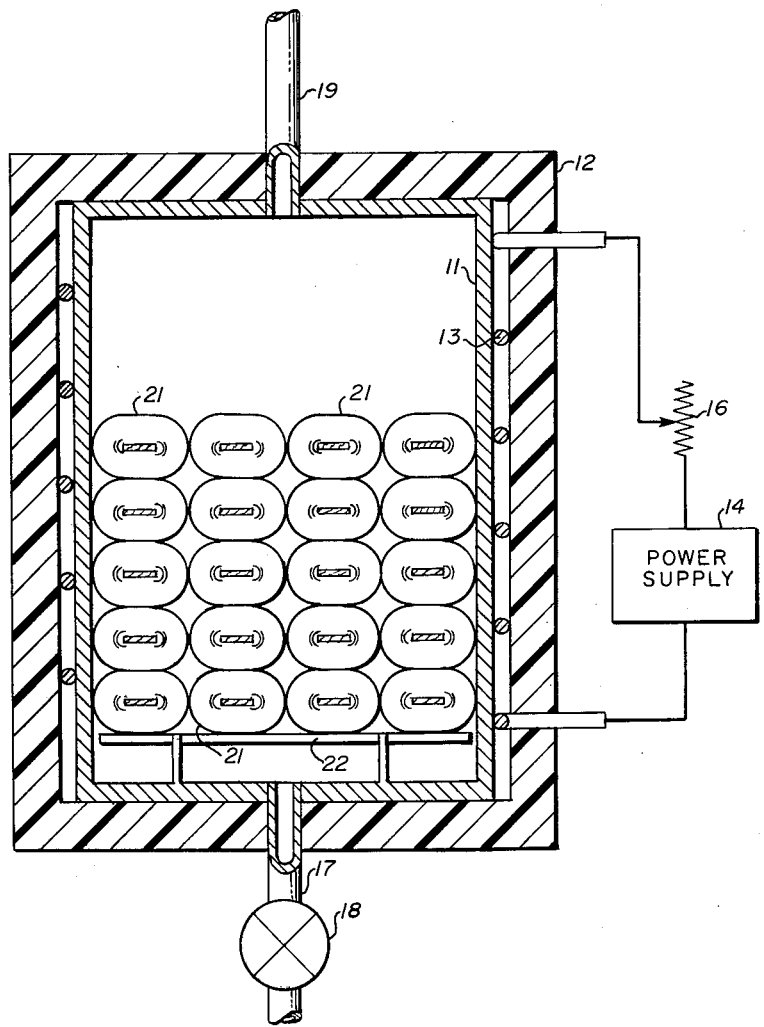
INVENTOR.
PAUL B. ARCHIBALD

3,032,434
PROCESS FOR CLEANING AND COATING SIZED BULK GLASS FIBROUS MATERIAL
Paul Benjamin Archibald, Livermore, Calif. (659 Bonita, Pleasanton, Calif.), assignor of twenty-five percent to Dominick Nardelli, Castro Valley, Calif.
Filed Sept 23, 1957, Ser. No. 685,389
3 Claims. (Cl. 117—46)

The present invention relates to an improved method of treating material such as cloth, thread or other materials with a coating as is commonly referred to as sizing.

This application is a continuation-in-part of my copending application filed February 14, 1956, Serial No. 565,301, and is now abandoned.

In making plastic laminates glass cloth is placed in layers around a male mold and impregnated with a plastic resin. The resin is caused to set by chemical means, heat or the like. When the resin hardens, a structurally sound light weight rigid material is produced, which has application in many fields. Since the first laminated glass cloth resin was produced, science has been experimenting to increase the structural strength of the laminate. It has been found that structural strength is limited by the degree of bonding between the glass cloth and the plastic.

To understand the problems for developing a better bond it is necessary to understand the manufacturing process in making glass cloth. To weave the glass cloth each strand of glass has to be coated with starch for lubrication while the strands are woven into cloth. It was found that a better bond was produced by removing this starch. Consequently, various methods were devised for removing the starch, among which are heating bolts of the cloth in a controlled heated oven or actually burning off the starch by flowing the cloth continuously through a heated zone. A time afterwards it was discovered that by sizing the cloth after the starch was "burned-off," a better bond was still produced. A silane compound was found to be the best sizing material since it forms a chemical bond with the glass and afterwards a chemical bond with the plastic. Since the silane is the weakest structural material in the laminate, it is required to be of minimum thickness on the glass but completely coating the glass to produce the maximum bonding area.

It has been the practice up to now to continuously flow the glass cloth through a solution containing a silane compound, having the cloth and silane come in contact and then removing the excess silane. This process is time-consuming and costly since the glass cloth is sized in turn yard by yard. A better method that is also economical would be to size large quantities or yardage of glass cloth at the same time.

There is chosen as an example of the present invention the impregnation or sizing of fiber glass cloth, thread, chopped fiber glass in bulk, matted fiber glass and like materials. In the manufacture of fiber glass cloth, for example, one of the steps following weaving is to heat clean rolls of the cloth in an oven at a relatively high temperature for a period of from one to three days with a subsequent cooling period followed by unrolling the cloth and passing same through a sizing bath. Owing to the large sized rolls which are preferably employed and to the weight of the cloth some time and effort must be expended in sizing the material by this method with a consequent addition in cost of the finished product.

The present invention contemplates the sizing of bulk materials without handling thereof whereby cost is materially reduced and process time is minimized. Additionally, the present invention is adapted for precise control of the amount of sizing applied to material and is particularly advantageous in being applicable to bulk materials. No unravelling, unrolling, layering or other like operations on the material to be sized are required to provide a uniform thin layer of material for sizing, for the invention provides an even controllable sizing application throughout the bulk of materials subjected to the process thereof.

It is an object of the present invention to provide a process for sizing without passing same through a liquid bath.

It is another object of the present invention to provide a process for evenly distributing sizing through rolled, matted, or otherwise compacted material without spreading out the material to a thin layer.

It is a further object of the present invention to provide an improved method of vapor sizing.

It is yet another object of the present invention to provide an improvement in the process of fiber glass materials through vapor sizing of same during other steps of the process.

The invention possesses other objects and features of advantage, some of which, with the foregoing, will be set forth in the following description of the preferred form of the invention and in the following drawing wherein is shown the process preformed with a simplified schematic version of an available oven chamber. It is to be understood, however, that variations in the showing made by the said description may be adopted within the scope of the invention as set forth in the claims.

The invention generally is comprised of the heating of a suitable sizing, and if desired in a vacuum, and subjecting heated bulk material to the resulting vapors of the sizing. The sizing material is controllably heated to temperatures below the boiling point thereof and the time of material impregnation is controlled whereby the exact amount of sizing vaporized and deposited are determinable. The sizing vapor permeates bulk material such as rolls of cloth or matted fibers to evenly coat same through and may either physically coat same or chemically bond thereto depending upon the sizing and material employed. In carrying out the invention it is necessary to choose a sizing which will not be adversely affected by vaporization as by decomposition or changes in characteristics at the process temperatures.

With regard to a particular example of the invention, consider the process of producing fiber glass cloth to be used in the manufacture of reinforced plastic laminates. Following the actual cloth manufacture in accordance with well known processes the rolls of cloth are cleaned by placing same in an oven and heating whereby such as the greige goods binder is burned off. This heat cleaning step is normally carried out at from 500 to 600 degrees F. for a period from 24 to 72 hours, following which the rolls are allowed to cool. The present invention contemplates the cooling of the heat cleaned rolls in the oven down to a temperature below the boiling point of the sizing to be employed and then the introduction into the oven of the sizing whereby the latter partially vaporizes, the resulting sizing vapors permeating the rolls of cloth to provide effective sizing thereof. There are employed in this case as sizings one of a group of compounds similar to hydrocarbons in which the tetravalent silicon replaces the carbon atom, and generally termed silanes. Suitable sizings for this invention are commercially available and of course a sizing is employed which is adapted for the particular material to be sized as it is herein contemplated that an actual chemical bond will be formed between sizing and material sized. If desired the oven may be evacuated at least during the sizing operation, and thus permit the use of sizings of lower boiling points. By way of example, Linde Air Products sold under trademark Y 1100 sizing whose chemical composition is amino triethoxysilane, currently commercially available, have been found satisfactory.

Referring to the drawing in greater detail there is shown schematically an oven chamber 11 enclosed with an insulating enclosure 12. Around the oven 11 is placed a heating means in the form of an electric resistance coil heater 13 to which a suitable power supply 14 supplies energy. A rheostat 16, in series with the coil 13 and supply 14, controls the temperature of the oven 11. The oven 11 has an inlet pipe 17 with a throttle valve 18 and has an exhaust vent 19 which can open to the atmosphere or to a vacuum pump (not shown) so that as mentioned above a partial pressure may be formed in the oven. Rolls or bolts 21 of the greige glass cloth which has each individual fiber coated with a solid lubricating material such as starch are placed on a convenient rack 22 within the oven chamber 11. With valve 18 closed the oven is heated by the coil heater 13 to a temperature around 500–600 degrees F. where the sizing is boiled or burned off the glass and out the vent pipe 18. Air may be admitted through valve 18 to burn the starch. In about 24 to 72 hours the solids are cleaned off the glass. Then the temperature of the oven 11 is lowered to about 350 degrees F. at which temperature the silanes mentioned above vaporize. Liquid silanes are introduced into the oven through pipe 17 by opening valve 18, but if the silanes are solids the oven door is opened and the silane is placed inside the oven and the door closed. I prefer to evacuate my oven slightly through the vent pipe 19 thereby giving me better control of my sizing process, by controlling vaporization of the silanes. The glass cloth is removed from the oven 11 in about one half to two hours after the glass has been completely sized with a suitable coating of silane.

This process saves time and money in that the glass cloth is only handled once, the glass is not cooled to ambient temperature after it is cleaned, the cloth is not moved to a different place to be sized, and the end of the bolts are not spoiled as when the cloth is cleaned and sized by a continuous process such as taught in Patent No. 2,845,364. Besides since the cloth does not see a flamed during a cleaning process its strength is not impaired. The cloth sized with silanes is now removed from the oven and is ready to be coated with a plastic resin. The time of sizing vaporization and material impregnation is controlled to provide a desired sizing deposit upon the material and heating is continued sufficiently to insure completion of the chemical reaction between sizing and material. Exposure time of the material to sizing vapor may vary from one-half hour to two hours although longer exposure is possible in certain circumstances wherein particularly heavy sizing deposit is desired. Generally the amount of sizing required is from 0.1% upward of sizing to material by weight.

Heating of the sizing to vaporize same is carried out at a temperature below the boiling point of the sizing for controlled vaporization in a closed chamber whereby full and even permeation of the rolls, matts, spools or the like of material is effected. The silane generally employed has a boiling point at about 450 degrees F. and preferably vaporization is accomplished at 350 degrees or above and below the boiling point. It has been determined that the sizing properties of silane are not adversely affected if same is not heated above the boiling point thereof and further that adequate vaporization occurs at 350 degrees and above so that this range of 350–400 degrees is chosen as preferable in carrying out the process of the invention.

It is further to be noted that by heating the fiber glass the tendency of silane vapor to condense on a cool outer surface thereof is counteracted so that the vapor evenly permeates the roll or the like and forms a uniform deposit on all surfaces thereof, both outside and inside the fiber glass bulk.

It will be appreciated from the foregoing that a material saving in time and labor results from vaporization sizing of material in bulk for it is not necessary to undo the material into a single thin layer for passing through a liquid bath. In certain cases wherein bulk material such as matted or chopped fiber glass is to be sized particular advantage lies for same is not at all adaptable to disposition in a thin layer. Additionally it is possible to apply with precise control a much lesser quantity of sizing by vapor permeation than is possible in liquid sizing immersion and as a uniform coating throughout the material bulk is effected by the former method lesser sizing quantities are quite satisfactory.

What is claimed is:

1. An improved process for treating glass cloth comprising the steps of placing and leaving the greige glass cloth in an oven chamber, raising the temperature within said chamber whereby the binder on said greige glass cloth is burnt off leaving said cloth clean, lowering the temperature within said oven chamber while leaving the clean cloth therein, introducing a volatile sizing material into said oven chamber whereby said sizing material vaporizes, adheres to, and coats each cleaned fiber of said glass cloth, and then removing said sized cloth from said oven chamber.

2. An improved process for treating glass cloth as claimed in claim 1 wherein said volatile sizing material being a volatile silane.

3. An improved process for treating glass cloth as claimed in claim 1 wherein said volatile sizing material being amino triethoxysilane.

References Cited in the file of this patent

UNITED STATES PATENTS

| | | |
|---|---|---|
| 194,422 | Elbers | Aug. 21, 1877 |
| 2,306,222 | Patnode | Dec. 22, 1942 |
| 2,446,119 | White et al. | July 27, 1948 |
| 2,469,625 | Barry | May 10, 1949 |
| 2,639,759 | Simison | May 26, 1953 |
| 2,649,396 | Witt et al. | Aug. 18, 1953 |
| 2,845,364 | Waggoner | July 29, 1958 |

FOREIGN PATENTS

| | | |
|---|---|---|
| 116,470 | Australia | Jan. 19, 1943 |